F. H. RICHARDS.
MECHANICAL MOVEMENT.
APPLICATION FILED NOV. 30, 1900.
976,916.
Patented Nov. 29, 1910.
3 SHEETS—SHEET 1.
Fig. 1.
Fig. 2.
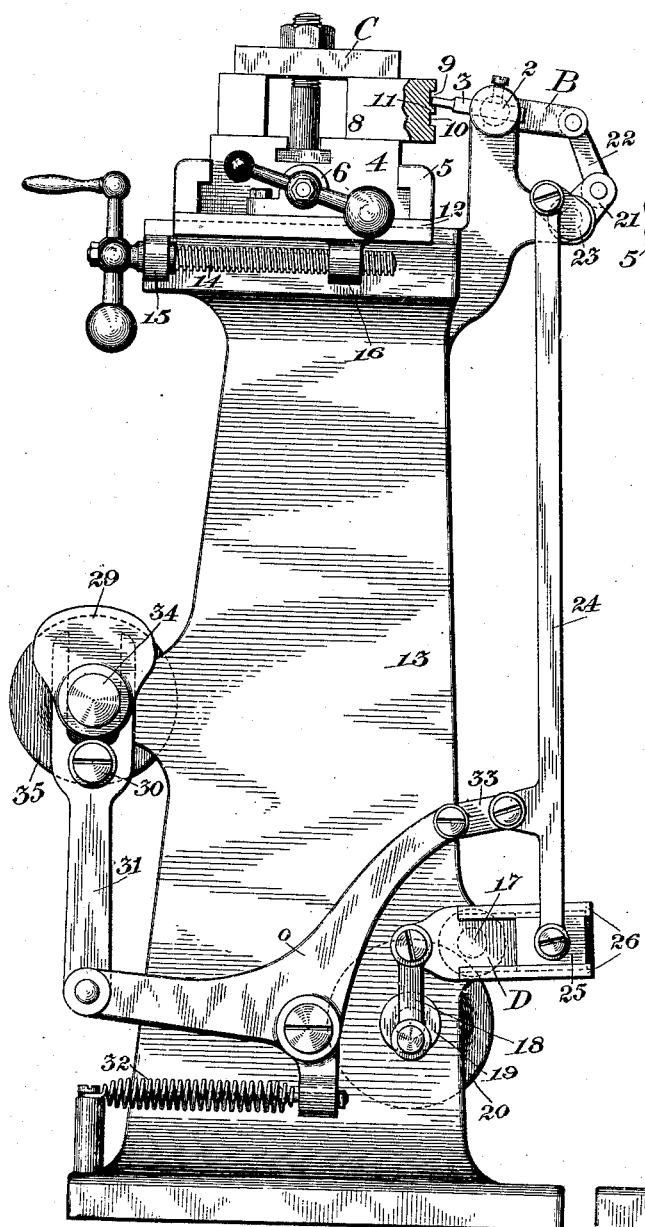
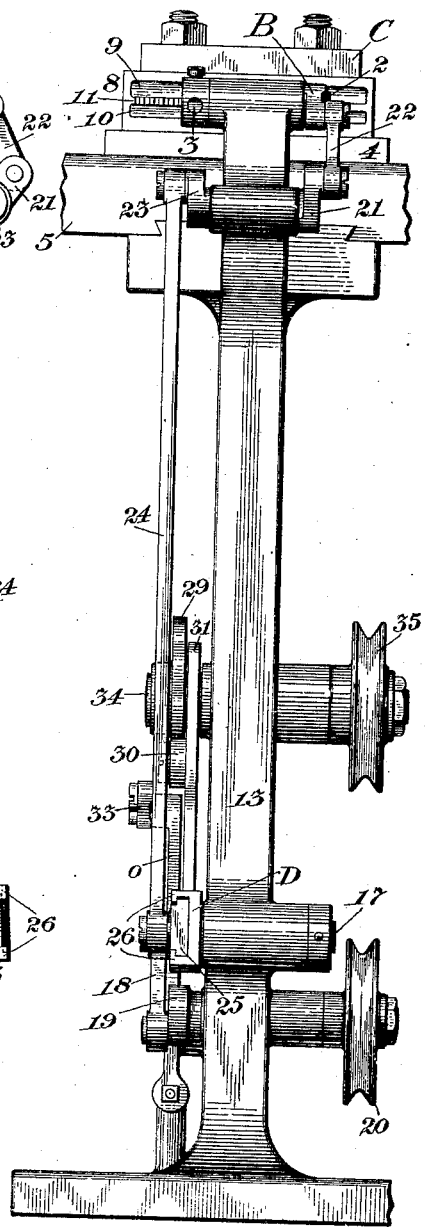
Witnesses:
Inventor:

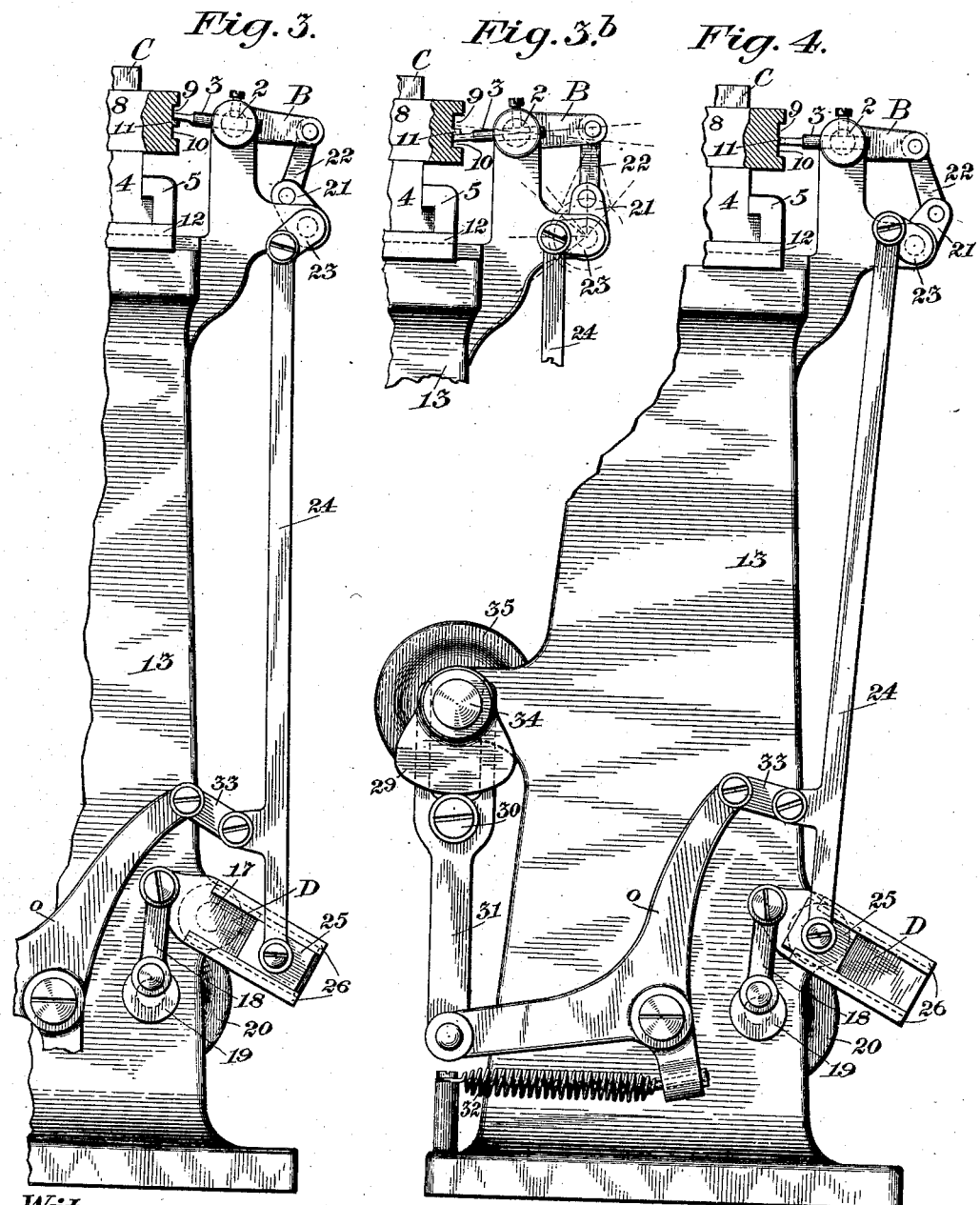

F. H. RICHARDS.
MECHANICAL MOVEMENT.
APPLICATION FILED NOV. 30, 1900.

976,916.

Patented Nov. 29, 1910.

3 SHEETS—SHEET 3.

Witnesses:
C. W. Smith
F. N. Nanland

Inventor:
F. H. Richards

UNITED STATES PATENT OFFICE.

FRANCIS H. RICHARDS, OF HARTFORD, CONNECTICUT, ASSIGNOR, BY MESNE ASSIGNMENTS, OF ONE-HALF TO AMERICAN TYPOGRAPHIC CORPORATION, A CORPORATION OF ARIZONA TERRITORY.

MECHANICAL MOVEMENT.

976,916. Specification of Letters Patent. Patented Nov. 29, 1910.

Application filed November 30, 1900. Serial No. 38,250.

*To all whom it may concern:*

Be it known that I, FRANCIS H. RICHARDS, a citizen of the United States, residing in Hartford, in the county of Hartford and State of Connecticut, have invented certain new and useful Improvements in Mechanical Movements, of which the following is a specification.

This invention relates to mechanical movements, and has for its object to furnish an improved mechanism whereby an oscillatory, or reciprocatory driven member may be operated either continuously or intermittently from a continuously-operating driving member; also to provide means in such a mechanism whereby the frequency of the to-and-fro movements of the driven member may be changed, and whereby this change in frequency may be effected during the period in which the driven member is brought from a state of rest to full operation, and vice versa.

For the purpose of disclosing my present invention, I have herein shown the same applied to a machine or apparatus having a reciprocatory driven member, which, in the present instance, constitutes a carrier supporting a tool or like instrumentality. In the present instance also this tool is illustrated as being adapted for a metal-working operation. It will, however, be understood that the said driven member may be employed for various other purposes within the scope and limits of my present invention.

Figure 9:
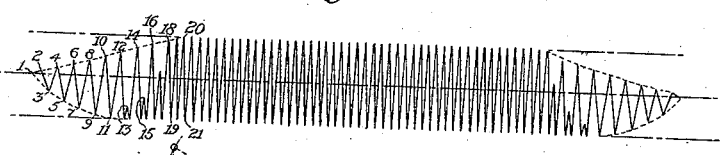
Figure 10:
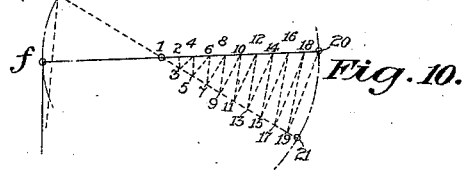

In the drawings accompanying and forming part of this specification, Figure 1 is a side elevation of a mechanical movement embodying my present improvements. Fig. 2 is a front elevation of the mechanism as seen from the right hand, Fig. 1. Fig. 3 is a partial view corresponding to Fig. 1 and illustrating certain operative parts in one of the positions which they assume. Fig. 3ᵇ is a view corresponding to Figs. 1 and 3 of the upper portion of the mechanism, and shows certain operative parts in a position intermediate to those assumed by them in Figs. 1 and 3. Fig. 4 is a view similar to Figs. 1 and 3, and shows the parts in still another position. Figs. 5, 6, 7, and 8 are diagrammatic views illustrating the principles of action of the mechanism. Fig. 9 is a diagrammatic view illustrative of the manner in which the driven member is started into action and is again brought to rest, and this view also illustrates the manner in which the frequency of the reciprocations or movements of the driven member may be changed during the operation thereof. Fig. 10 is also a diagrammatic view further illustrative of the features hereinafter set forth in connection with the preceding diagrammatic views.

Similar characters of reference designate corresponding parts in all the figures of the drawings.

My present improvements are applicable to mechanisms in general where it is desired to produce a comparatively rapid to-and-fro or alternating movement of the driven member, and for illustrating one such adaptation I have shown the driven member B mounted for such reciprocatory or oscillatory movement upon the shaft or carrier 2. The driven member is, in this particular adaptation of the invention, a reciprocating member, and as an application to a useful purpose the reciprocatory member is shown as supplied with a tool 3. In the present instance, also, the mechanism embodying the invention is shown furnished with a shiftable chuck or holder comprising a main slide 4, suitable means for traversing the same, here shown to embrace guides 5 and a traversing screw 6, and means C for holding in place on the slide a piece of work indicated in a general way by 8 to be operated upon by the tool. This piece of work is shown as having formed therein two channels 9 and 10, between which a rib 11 is to have cut therein by means of the tool notches or teeth which may form a rack. The reciprocatory movement of the tool from the position indicated in Fig. 1 to the position indicated in Fig. 3ᵇ and back again, indicates how the operation of cutting notches in a rib located in a block between two channels, can be accomplished, and which operation with the aid of the traversing means described may be utilized to form teeth in this rib. For the purpose of moving the work toward and from the tool, the said slide 4 is shown mounted upon a saddle or carrier 12, fitted to slide upon the top of the main frame or supporting column 13, and movable back and forth by means of a traversing screw 14, mounted in the bearings 15 upon the main frame and in engagement with a nut 16 upon the saddle. The operation of this work-carrying apparatus will be understood from the foregoing without further explanation.

Passing now to a description of the means for producing the reciprocatory movement of the driven member from the movement of the continuously-operating driving member, a lever D is shown which is mounted to vibrate about an axis 17. Motion may be imparted to this vibrating lever by means of a link 18 connecting the lever with the crank 19, driven by any suitable means, for instance, through a band or pulley-wheel 20.

The actuator connection or train of mechanism located between the driving and driven members for transferring motion from the former to the latter, and for effecting a transformation or alteration of this motion will now be described. Adjacent to the driven member B is a crank arm 21 whose shaft or journal is suitably mounted in the main frame 13 or projection thereof to permit the crank arm to swing upon both sides of the line joining its axis of oscillation with the axis of the joint between the connecting link 22 and the driven member B, as seen in a side elevation of the apparatus. It is evident from the operative relation of the crank arm to the driven member that a continuous swing of the arm from one extremity of its movement on one side of said line to the other extremity upon the other side will cause the movement of the driven member in one direction, followed by a reverse movement as the crank arm passes the highest point of the arc in which it swings. In other words, a single, continuous movement of the crank-arm results, under these conditions, in a double movement of the driven member. Of course, it will be understood that the tool located upon the opposite side of the oscillatory axis of the driven member will have its motions reversed.

The vibration of the crank arm 21 is effected, in the present instance, by affixing to the shaft to which the crank arm is attached an arm 23, moved to and fro by the driving member through the medium of the connecting rod 24. Assuming that this connecting rod is set in full motion by the vibrating lever or driver D, whose amplitude of vibration is sufficient to cause the extent of movement necessary, it is plain that the train of mechanism forming the actuator connection will effect an oscillation or reciprocation of the driven member, the frequency of which will be greater than that of the vibration of the vibrating lever.

It is a further object of the present improvement to provide means whereby the change in the frequency of the alternating movement of the driven member may be accomplished while the driving and driven members are both in movement, or which may be brought about while the driving member is in full and continuous operation, and the driven member is being speeded up from a state of rest to its maximum amplitude of to-and-fro movement, and vice versa. To enable these results to be attained the attachment of the connecting rod 24 is made to a movable part or block 25 constituting the driving member, and, fitted in guides 26 to slide along the lever D to and from the point about which the latter swings. This construction will permit a movement of the connecting rod 24, and hence crank arm 21, variable in quantity or extent from the maximum when the block 25 is at its outer extreme position to zero, when the axis of the connecting rod connection coincides with the axis of vibration of the vibrating lever. It will further be seen from this organization of the various elements that, as the path described by the block 25 about the axis of the vibrating lever D, during the vibration of the latter, regularly increases in length from zero to maximum as the block is moved outward there is one position for said block upon the lever up to which its sidewise or transverse movement is not sufficient to swing the crank-arm 21 on both sides of the previously mentioned reference line and for all positions beyond which the sidewise movement of the block will be long enough to cause a double movement of the crank arm in the manner aforesaid. Therefore the frequency of the oscillations or reciprocations of the driven member will depend upon the position of the block 25 with reference to the lever D.

The means shown for adjusting the part 25 along lever D comprises an angle lever O fulcrumed upon or pivoted to the main frame or supporting column 13, and one arm of which may be depressed by means of the cam 29 bearing against an antifriction roller 30, carried by a push-rod 31, connected at its lower end to the angle lever and at its upper extremity properly guided. A spring 32 serves to turn the angle lever in a reverse direction to that in which it is rotated by the cam.

Jointed to both the connecting rod 24 and the angle lever O is a link 33, which serves to transfer motion from the angle lever to the connecting rod, and thereby shift the block 25 through the guides 26. This link 33 serves a further function in controlling the movement of the lower portion of the connecting rod 24 and block 25, and preferably the point at which the link is connected to the angle lever, as well as the position of the latter with respect to the block 25 and connecting rod 24, will be such as to reduce the slipping of said block in its guides during the movement of lever D to a minimum.

The cam-shaft 34 is rotated in any suitable manner; for instance, it may be turned by means of a band or pulley-wheel 35 affixed to the shaft.

Referring to Fig. 1, the operative parts are shown in a position in which the block 25 is adjacent to the outer extremity of the vibrating lever D, and the outer end of the latter has been elevated. Fig. 3 shows the position assumed by the various parts when the outer end of the vibrating lever has been tilted downward by a semi-rotation of the driving crank 19 from the position shown in Fig. 1. Fig. 3<sup>b</sup> shows the position of the parts when the block 25 has the same relative location in the lever D as shown in Fig. 3, but the outer extremity of this lever has moved upward from the position in that figure and the crank-arm 21 of the actuator connection or intermediate train has reached its highest point. Fig. 4 shows the block 25 brought inward to its inoperative position through the rotation of the cam shaft 25, and the depression of the push rod 31.

With the particular relative lengths, sizes and in the organization shown, the crank 19 which serves to vibrate the lever D is in its lowermost position, when this lever has assumed a substantially horizontal position, the connecting rod 24 having been raised thereby upward as the lever moves to this position, but it is of course understood that the invention is not limited to the express relative dimensions and relation of parts shown.

Figure 5:
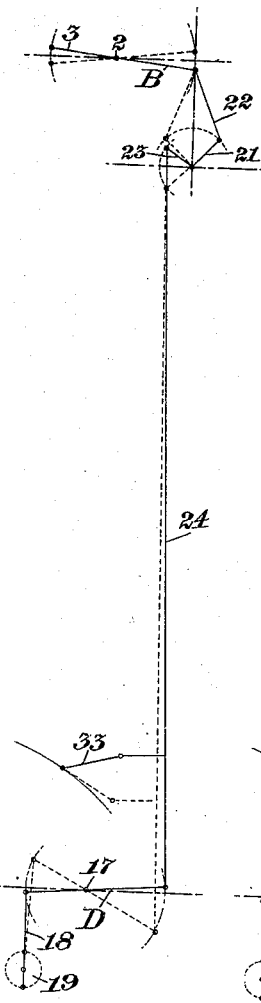
Figure 6:
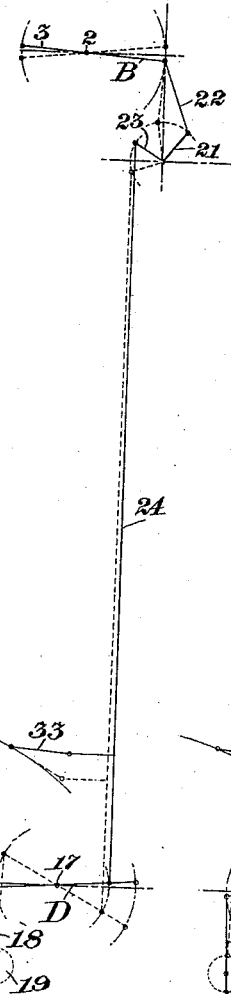
Figure 7:
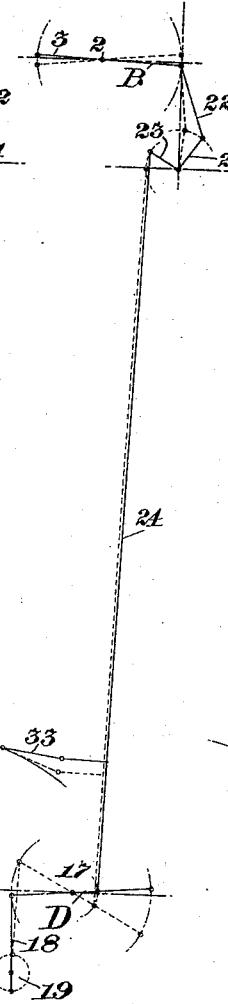
Figure 8:
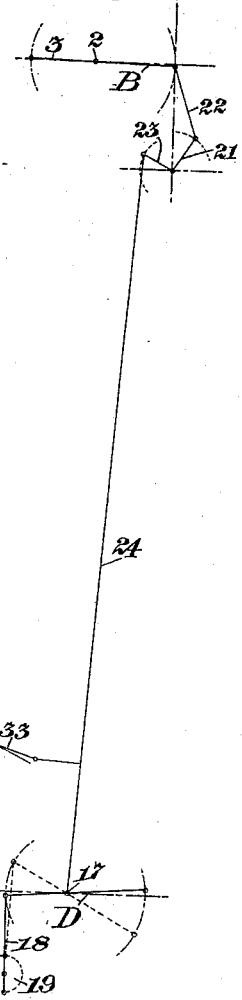

Referring for a more detailed description of the operation of the mechanism to the diagrammatic views, Figs. 5 to 10, inclusive, the various parts concerned are here represented by center lines only. In Fig. 10 the center line of the vibrating lever D is represented by $f$—20, this line being supposed to represent the lever in one extreme position of its movement, while the dotted line shown at an angle thereto represents the same in its other extreme position. The point 1 is taken as coinciding with the projection on the plane of the paper of the axis about which the lever vibrates, and the point 20 is a similar projection of the axis about which the connecting rod 24 oscillates on its connection with the block 25 when the latter has been shifted to the end of the vibrating lever. Various arbitrary intermediate points are designated by the intermediate numerals. Starting with a position of the parts in which the axis of the connecting rod to block connection coincides with the axis of the vibrating lever or driver D, the driving and driven members and the intermediate train are shown in full lines in Fig. 8 in one extreme position, while the other extreme position is represented in dotted lines. Center lines are designated in all these diagrammatic views with the same characters as are used to indicate the parts which they represent. A more specific description of the parts is therefore deemed unnecessary. It will be seen that no motion is imparted to the crank-arm 21 by the movement of the vibrating lever D when the block 25 is in the position shown in Fig. 8. Assuming now that the block has been moved outward toward the outer end of the vibrating lever or driver D, the position of the parts is shown in Fig. 7 corresponding to an intermediate position of the block. Fig. 10 shows the increased length of the transverse movement of the block as it is moved outward along the vibrating lever, a number of arbitrary points of position consecutively numbered being shown. It will be seen on examining Fig. 7 that in the position there represented the throw or movement of the movable block 25 is not yet sufficient to carry the crank arm 21 to the left of the line joining the axis about which it oscillates with the center of the connection of the link 22 with the driven member B; hence, any single movement of the driving member or lever D will produce but a single movement of the driven member. Referring next to Fig. 6, the movable block is here represented as having moved nearer to the outer end of the lever D, thereby increasing its possible transverse movement or throw to such an extent as to cause a sufficient movement of the arm 23 to bring about the swinging of the crank arm 21 past the aforesaid reference line. Under these circumstances, therefore, a single movement of the block upward and downward will result in a compound movement of the driven member; or, in other words, a movement in one direction followed by a reverse movement. This mode of operation is shown graphically in Fig. 9, where the reciprocatory movements of the tool portion of the holder or carrier forming the driven member are indicated by lines 2 to 3, 3 to 4, &c., gradually increasing in length. These lines are shown separated from each other transversely the better to exhibit the nature of the movements, but it is understood that actually the movements are superimposed one on the other. The various positions of the driven member designated in Fig. 9 correspond with the similarly designated positions of block 25 in Fig. 10. The point at which the character of the movement of the driven member is altered with respect to its frequency is shown by the sharp peak appearing at a consecutively increasing distance from the base line in Fig. 9. This increased frequency of movement of the driven member continues from this point to the extreme outward position for the movable block, including all intermediate ones, and the oscillation reverts to the original frequency when the block is moved back toward the axis which may be for the purpose of suppressing any movement in the driven member. Figs. 5, 6, 7, and 8 also show the effect of the control exerted by the suspending link 33 in reducing the slip of the block 25 in its guides as the inclination of the vibrating lever D changes; compelling the block to move horizontally and vertically in space, an amount approximately as near as may be to such actual movements the block must have to remain in a given position in the moving lever.

Having described my invention what I claim is—

1. The combination, with a driving member and a vibrating lever upon which said member is mounted and along which it is adjustable, of a driven member supported and adapted for reciprocatory movement, an actuator connection operated by the driving member and connected to operate the driven member, and comprising a connection with said driving member mounted on the vibrating lever, and means adjacent to the driven member whereby an adjustment of said driving member will effect a change in the frequency of the movements of the driven member relatively to the movements of the driving member.

2. In a mechanical movement, the combination with a member movable in reversible directions, of means for varying the movement of the same, an oscillatory driven member, a rock shaft, members extending from the same a connecting member pivoted to the member first named and one of the members mentioned secondly, and a link pivoted to the other of the second mentioned members, and to the driven member, the parts being so organized that said link is capable of being shifted from one side to the other of the line drawn from the axis of said rock shaft to the pivotal axis of the joint between the link and the driven member.

3. In a mechanical movement, the combination with a member movable to and fro, of an actuator for varying the throw of the same, an oscillatory driven member, a rock shaft, arms extending from the rock shaft, a connecting rod pivoted to the first named member and to one of the arms, a link pivoted to the other arm and to the driven member, the parts being so organized that said link is capable of being shifted from one side to the other of the line drawn from the axis of said rock shaft to the pivotal axis of the joint between the link and the driven member.

4. In a mechanical movement, the combination with a member movable in a given path, of an actuator, an oscillatory driven member, a rock shaft, arms extending from the rock shaft, a connecting rod pivoted to the first named member and to one of the arms, a link pivoted to the other arm and to the driven member, and a link extending from said actuator to the connecting rod, the parts being so organized that the link connecting one of said parts to the driven member is capable of being shifted from one side to the other of the line drawn from the axis of the rock shaft to the pivotal axis of the joint between the link and the driven member.

5. In a mechanical movement, the combination with a block movable to and fro, of means for varying the throw of the same, an oscillatory driven member, a rock shaft, arms extending from the shaft, a connecting rod pivoted to the block and one of the arms and a link pivoted to the other arm, and to the driven member, the parts being so organized that said link is capable of being shifted from one side to the other of the line drawn from the axis of said rock shaft to the pivotal axis of the joint between the link and the driven member.

6. In a mechanical movement, the combination with a block movable to and fro, of a cam for varying the throw of the same, an oscillatory driven member, a rock shaft, arms extending from the rock shaft, a connecting rod pivoted to the block and one of the arms, a link pivoted to the other arm and to the driven member, the parts being so organized that said link is capable of being shifted from one side to the other of the line drawn from the axis of said rock shaft to the pivotal axis of the joint between the link and the driven member.

7. In a mechanical movement, the combination with a block movable to and fro, of a cam, a cam lever, an oscillatory driven member, a rock shaft, arms extending from the rock shaft, a connecting rod pivoted to the block and one of the arms, a link pivoted to the other arm and to the driven member, and a link extending from said connecting rod to said cam lever, the parts being so organized that the link connecting one of said arms to the driven member is capable of being shifted from one side to the other of the line drawn from the axis of the rock shaft to the pivotal axis of the joint between the link and the driven member.

8. In a mechanical movement, the combination with a block, and a vibratory lever along which said block is movable to and fro toward and away from the pivotal axis of the lever, of means for shifting the block along the lever, an oscillatory driven member, a rock shaft, arms extending from said shaft, a connecting rod pivoted to the block and one of the arms, and a link pivoted to the other arm and to the driven member, the parts being so organized that said link is capable of being shifted from one side to the other of the line drawn from the axis of said rock shaft to the pivotal axis of the joint between the link and the driven member.

9. In a mechanical movement, the combination with a block, and a vibratory lever along which said block is movable to and fro toward and away from the pivotal axis of the lever, of a cam for shifting the block along the link, an oscillatory driven member, a rock shaft, arms extending from the rock shaft, a connecting rod pivoted to the block and one of the arms, and a link pivoted to the other arm and to the driven member, the parts being so organized that said link is capable of being shifted from one side to the other of the line drawn from the axis of said rock shaft to the pivotal axis of the joint between the link and the driven member.

10. In a mechanical movement, the combination with a block, and a vibratory lever along which said block is movable to and fro toward and away from the pivotal axis of the lever, of a cam, a cam lever, an oscillatory driven member, a rock shaft, arms extending from the rock shaft, a connecting rod pivoted to the block and one of the arms, a link pivoted to the other arm and to the driven member, and a link extending from said connecting rod to said cam lever, the parts being so organized that the link connecting one of said arms to the driven member is capable of being shifted from one side to the other of the line drawn from the axis of the rock shaft to the pivotal axis of the joint between the link and the driven member.

11. In a mechanical movement, the combination with a block, a vibratory lever along which said block is movable to and fro toward and away from the pivotal axis of the lever, and a crank for vibrating the lever, of means for shifting the block along the lever, an oscillatory driven member, a rock shaft, arms extending from the shaft, a connecting rod pivoted to the block and one of the arms, and a link pivoted to the other arm and to the driven member, the members being so organized that said link is capable of being shifted from one side to the other of the line drawn from the axis of said rock shaft to the pivotal axis of the joint between the link and the driven member.

12. In a mechanical movement, the combination with a block, a vibratory lever along which said block is movable to and fro toward and away from the pivotal axis of the lever, and a crank for vibrating the lever, of a cam for shifting the block along the lever, an oscillatory driven member, a rock shaft, arms extending from the rock shaft, a connecting rod pivoted to the block and one of the arms, a link pivoted to the other arm and to the driven member, the members being so organized that said link is capable of being shifted from one side to the other of the line drawn from the axis of said rock shaft to the pivotal axis of the joint between the link and the driven member.

13. In a mechanical movement, the combination with a block, a vibratory lever along which said block is movable to and fro toward and away from the pivotal axis of the lever, and a crank for vibrating the lever, of a cam, a cam lever, an oscillatory driven member, a rock shaft, arms extending from the rock shaft, a connecting rod pivoted to the block and one of the arms, a link pivoted to the other arm and to the driven member, and a link extending from said connecting rod to said cam lever, the members being so organized that the link connecting one of said arms to the driven member is capable of being shifted from one side to the other of the line drawn from the axis of the rock shaft to the pivotal axis of the joint between the link and the driven member.

FRANCIS H. RICHARDS.

Witnesses:
   FRED. J. DOLE,
   C. E. VOSS.